(12) United States Patent
Chepuri et al.

(10) Patent No.: US 9,348,383 B2
(45) Date of Patent: May 24, 2016

(54) APPARATUS FOR STARTING UP SWITCHING VOLTAGE REGULATOR

(71) Applicant: Intel Corporation, Santa Clara, CA (US)

(72) Inventors: Raghu Nandan Chepuri, Bangalore (IN); Fenardi Thenus, Portland, OR (US); Peng Zou, Tumwater, WA (US); Henry W. Koertzen, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 13/783,115

(22) Filed: Mar. 1, 2013

(65) Prior Publication Data

US 2014/0250310 A1    Sep. 4, 2014

(51) Int. Cl.
*G06F 1/32* (2006.01)
*G06F 1/26* (2006.01)
*H02M 1/36* (2007.01)

(52) U.S. Cl.
CPC . *G06F 1/26* (2013.01); *H02M 1/36* (2013.01); *G06F 1/3203* (2013.01)

(58) Field of Classification Search
CPC ................................. G06F 1/26; H02M 3/156
USPC ........................................................ 713/300
See application file for complete search history.

(56) References Cited

U.S. PATENT DOCUMENTS

| 5,570,276 | A * | 10/1996 | Cuk et al. .......................... 363/16 |
| 2002/0046354 | A1 * | 4/2002 | Ostrom et al. ................. 713/300 |
| 2002/0125840 | A1 * | 9/2002 | Ha et al. ......................... 315/291 |
| 2002/0135339 | A1 * | 9/2002 | Tang et al. ..................... 323/274 |
| 2005/0218871 | A1 * | 10/2005 | Kang et al. ..................... 323/265 |
| 2006/0017492 | A1 * | 1/2006 | Scratchley et al. ............ 327/538 |
| 2008/0088284 | A1 * | 4/2008 | Weng ............................. 323/271 |
| 2008/0137257 | A1 * | 6/2008 | Lee ................................ 361/111 |
| 2009/0033298 | A1 * | 2/2009 | Kleveland ...................... 323/271 |
| 2011/0210709 | A1 * | 9/2011 | Mounier et al. ............... 323/271 |
| 2012/0153909 | A1 * | 6/2012 | Bucossi et al. ................ 323/271 |
| 2012/0153910 | A1 * | 6/2012 | Bulzacchelli et al. ......... 323/272 |
| 2013/0076320 | A1 * | 3/2013 | Chan et al. .................... 323/271 |
| 2014/0145691 | A1 * | 5/2014 | Nagda et al. .................. 323/271 |
| 2014/0210545 | A1 * | 7/2014 | Leibowitz et al. ............ 327/540 |

* cited by examiner

*Primary Examiner* — Thomas Lee
*Assistant Examiner* — Volvick Derose
(74) *Attorney, Agent, or Firm* — Green, Howard & Mughal LLP

(57) ABSTRACT

Described is a soft-start scheme for a voltage regulator. The apparatus comprises: a first voltage regulator to provide regulated voltage to an output node coupled to a load, the first voltage regulator operable to be in open loop via a bypass unit, the first voltage regulator including a comparator; and a second voltage regulator, coupled to the first voltage regulator, operable to be in closed loop, via the bypass unit, to provide a reference voltage for the comparator of the first voltage regulator.

20 Claims, 7 Drawing Sheets

US 9,348,383 B2

APPARATUS FOR STARTING UP SWITCHING VOLTAGE REGULATOR

BACKGROUND

When a voltage regulator (VR) starts up i.e., load capacitor of the VR begins to charge from zero volts to the desired output voltage level, large in-rush current flows through the VR inductor which is coupled to the load capacitor. The in-rush current may cause an overshoot of voltage on the common node of the load capacitor and inductor. Such in-rush current and overshoot may damage transistors and inductor(s) of the VR. The in-rush current and overshoot may also cause protection circuitry to trip (i.e., get engaged). For example, over current protection (OCP) or over voltage protection (OVP) circuits may be turned on due to the in-rush current which may cause the processor with the VR to prematurely turn off or go into safe mode.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
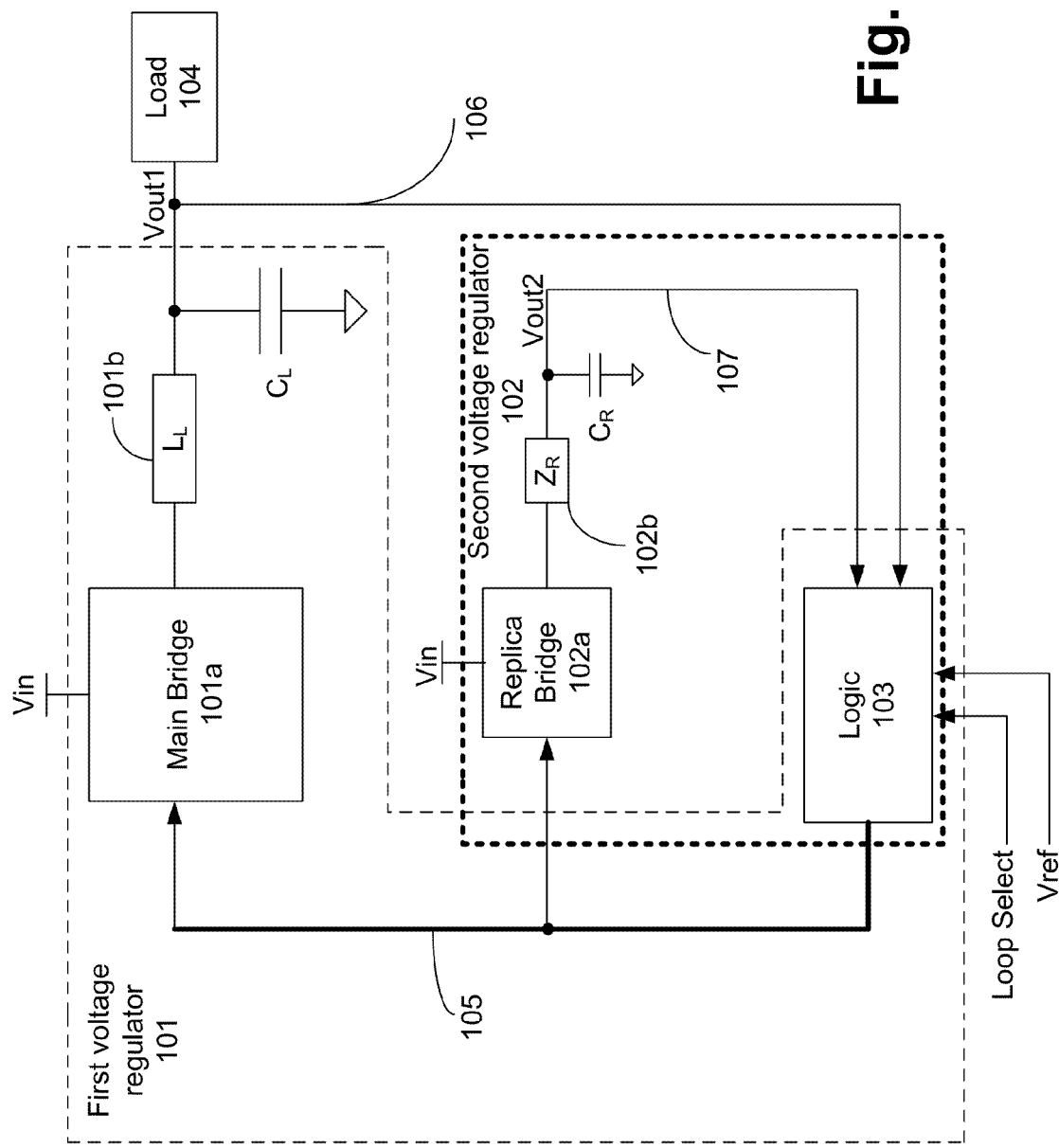
FIG. 1 is a dual voltage regulator (VR) architecture, according to one embodiment of the disclosure.

The embodiments describe a dual voltage regulator (VR) architecture which uses a replica bridge (part of second VR) to drive a main bridge (part of first VR) in open loop mode to implement controlled charging of output load capacitor. In one embodiment, the replica bridge is substantially smaller in size (i.e., area) than the main bridge. For example, the replica bridge is a thousand times smaller in size than the main bridge. In one embodiment, the replica bridge emulates the transfer function of the main bridge to assist the main bridge to charge the output load capacitor to a voltage level substantially equal to a final operational voltage level. In one embodiment, when the output load capacitor is charged up to its predetermined voltage level, the replica bridge is disengaged i.e., the replica bridge no longer drives the main bridge. In such an embodiment, the main bridge is then allowed to operate in closed loop mode with little or no impact in current drive strength and voltage level on the output load capacitor.

There are many technical effects of the embodiments. Some non-limiting technical effects include generation of a smooth output voltage and current without the negative impacts of in-rush current and overshoot when a VR starts up. The embodiments also safe-guard transistors and other devices (e.g., inductors) of the VR from permanent damage during VR start up. As VRs are integrated in processors, VRs may be expected to turn on and off frequently as the processor performs power management. The embodiments allow for non-destructive charge up of an output voltage supply for a load (e.g., a processor core). Other technical effects will be evident by the embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 is a dual VR architecture 100, according to one embodiment of the disclosure. In one embodiment, dual VR architecture 100 comprises first VR 101, second VR 102, logic 103, and load 104. In this embodiment, second VR 102 is a replica of first VR 101. The term "replica" generally refers to circuit blocks with substantially the same function (or transfer function) and same logic, but can be of different sizes. In this embodiment, second VR 102 is substantially smaller than first VR 101. For example, second VR 102 is 1000 times smaller than first VR 101. In one embodiment, second VR 102 operates in closed loop mode during start-up of first VR 101, while first VR 101 operates in open loop mode during start-up of first VR 101. In one embodiment, second VR 102 is subsequently disengaged by disabling its closed loop to operate in open loop mode after start-up of first VR 101 is complete. In such an embodiment, first VR 101 is subsequently enabled to function in closed loop mode.

In one embodiment, duration of start-up is pre-defined. For example, duration of start-up is determined by expiration of a timer (e.g., counter). In one embodiment, a timer counts for a few milliseconds before it expires to indicate an end of start-up duration. In other embodiments, other count values may be used. In one embodiment, timer count that determines duration of start-up is programmable by hardware (e.g., via fuses, jumpers, etc.) or software (e.g., operating system). In one embodiment, duration of start-up is determined by assertion of power-good signal of a processor which indicates that Vout1 106 has reached a stable and desired level.

In one embodiment, first VR 101 comprises a main bridge 101*a*, one or more inductors ($L_L$) 101*b*, and output load capacitor $C_L$. In one embodiment, one or more inductors ($L_L$) 101*b* and output load capacitor $C_L$ form a transfer function (also referred as the first transfer function). So as not to obscure the embodiments, all components and circuits of a VR are not disclosed. In one embodiment, main bridge 101*a* receives modulated signal 105 and sources and sinks current to and from node 106. The term node and signal on the node are interchangeably used with respect to the identifier in the figure. For example, node 106 and signal 106 interchangeably use identifier 106 to indicate either physical node 106 or signal on node 106.

In one embodiment, one or more inductors 101*b* are on-die inductors integrated within the same die as first and second VRs (101 and 102) and load 104. In one embodiment, load 104 is a processor core. In other embodiments, load 104 can be any part or all of a processor. In one embodiment, main bridge 101*a* comprises high and low side switches controllable by the modulated signal 105. In one embodiment, main bridge 101*a* receives input power supply Vin and generates a regulated output power supply Vout1 (same as 106) for load 104 using input power supply Vin.

In one embodiment, second VR 102 (also referred to as replica VR) comprises a replica bridge 102*a*, impedance unit 102*b* ($Z_R$), and replica capacitor $C_R$ that provides output voltage Vout2 107 for logic 103. In one embodiment, replica bridge 102*a* has the same circuit architecture as main bridge 101*a*, but is smaller in size. For example, replica bridge 102*a* may have devices which are 1000 times smaller in size than devices of main bridge 101*a*. In such an embodiment, second VR 102 is significantly smaller than first VR 101 in terms of area and power consumption. For example, second VR 102 consumes 1000 times less power consumption than first VR 101.

In this embodiment, logic 103 is shared between first and second VRs 101 and 102, respectively. In one embodiment, during start-up, logic 103 uses 107 (or its copy) to compare Vout2 107 against a reference voltage (Vref). In such an embodiment, Vout1 106 is bypassed i.e., not used by logic 103 to be compared against Vref. In this embodiment, a signal generator (part of logic 103) generates a continuous switching signal 105 (also called modulated signal 105) according to the compared output of 107 and Vref. In one embodiment, signal generator is a pulse width modulator (PWM). In other embodiments, other types of signal generators may be used. In one embodiment, logic 103 receives Loop Select signal which is used to select either Vout1 106 or Vout2 107 as feedback signals for comparing against Vref. While the embodiment of FIG. 1 shows a single modulated signal 105, modulated signal 105 may represent different modulated signals. For example, main bridge 101*a* initially receives a first modulated signal when main bridge 101*a* operates in open loop mode while replica bridge 102*a* initially receives a second modulated signal generated according to closed loop operation of replica bridge 102*a*.

In one embodiment, impedance unit 102*b* and replica capacitor $C_R$ form a transfer function (also referred as second transfer function). In one embodiment, the second transfer function is substantially the same as the first transfer function. One possible reason for having the first and second transfer functions to be substantially the same is to have similar feedback response times and stability characteristics for the first VR 101 and the second VR 102. In one embodiment, impedance unit 102*b* comprises resistors. In another embodiment, impedance unit 102*b* comprises inductors. In another embodiment, impedance unit 102*b* comprises a combination of inductors and resistors. In one embodiment, the physical size of impedance unit 102*b* and replica capacitor $C_R$ is smaller than one or more inductors 101*b* and load capacitor $C_L$ combined. For example, impedance unit 102*b* and replica capacitor $C_R$ is 1000 times smaller than one or more inductors 101*b* and load capacitor $C_L$.

In one embodiment, replica bridge 102*a* is sized in such a way that it replicates the duty cycle to output voltage ratio of the main bridge 101*a*. In one embodiment, main bridge 101*a* operates in open loop mode during start-up and charges the output Vout1 106 close to the voltage level of Vref. In such an embodiment, after Vout1 106 is settled to voltage level of Vref, logic 103 selects the feedback voltage from 106 instead of feedback voltage from 107 to close the loop to main bridge 101*a*. In this embodiment, since Vout1 106 is settled close to voltage level of Vref and the duty cycle of signal 105 has reached steady state value, there is little or no disturbance in the error amplifier (e.g., 203 of FIG. 2) and compensation network (part of 200 of FIG. 2) when main bridge 101*a* switches from open loop operation to closed loop operation.

Figure 2:
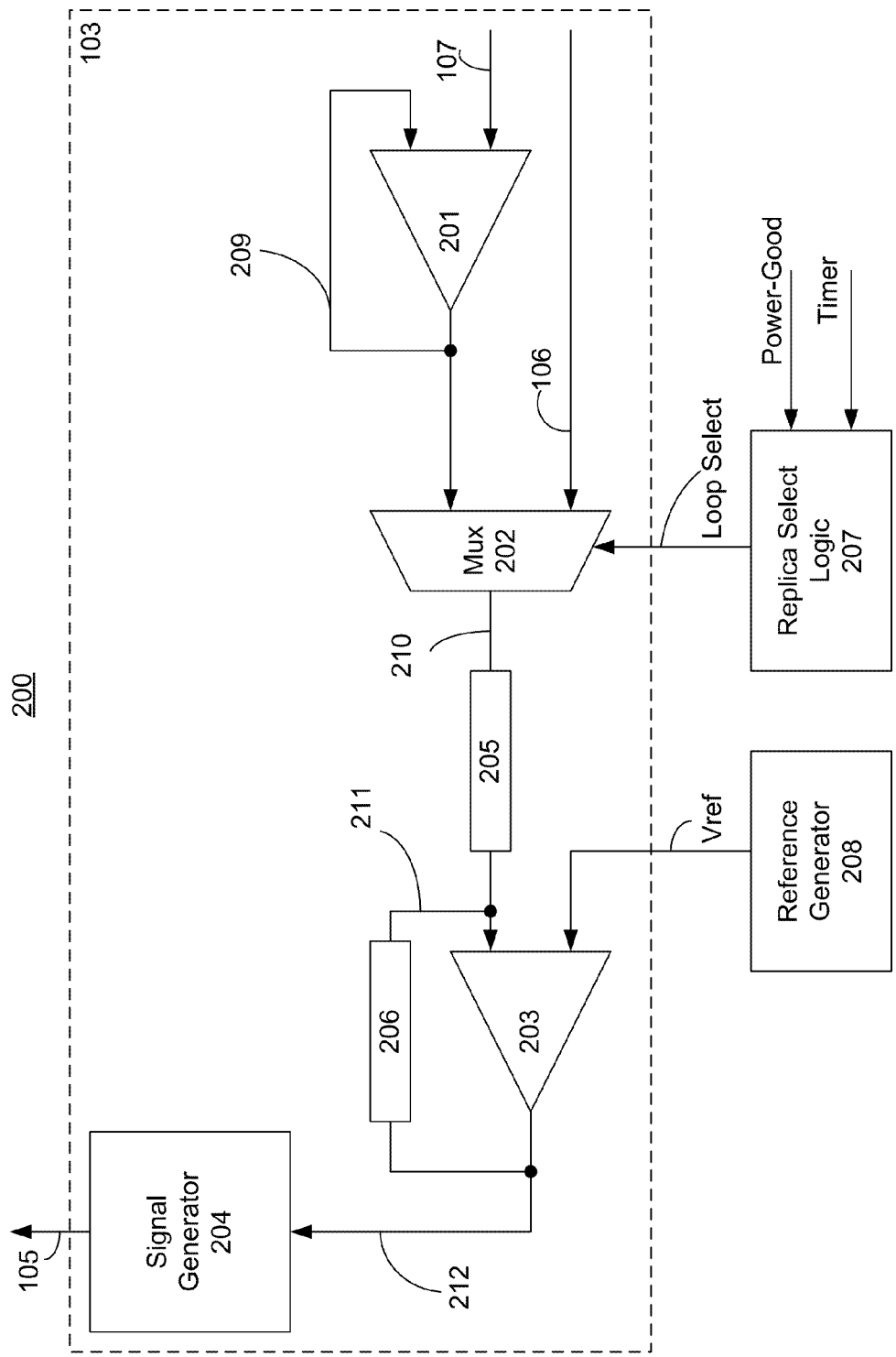
FIG. 2 is a logic unit to operate the dual VR architecture, according to one embodiment of the disclosure.

FIG. 2 is a circuit 200 with logic unit to operate the dual VR architecture 100, according to one embodiment of the disclosure. It is pointed out that those elements of FIG. 2 having the same reference numbers (or names) as the elements of any other figure can operate or function in any manner similar to that described, but are not limited to such.

In one embodiment, circuit 200 comprises logic 103 which includes a voltage follower 201, a multiplexer (mux) 202, an error amplifier 203, and a signal generator 204. In one embodiment, logic 103 further comprises a first compensation network 205 and a second compensation network 206. In one embodiment, error amplifier 203 receives Vref from a reference generator 208.

In one embodiment, voltage follower 201 comprises an amplifier operating in a unity gain configuration. One reason for voltage follower 201 is to reduce any capacitive coupling on 107 from multiplexer 202. Voltage follower 201 may also be used to generate a low impedance node at the input of the first compensation network 205 to replicate loop dynamics of the main loop (i.e., loop encompassing main bridge 101*a*). In one embodiment, multiplexer 202 is a two input multiplexer which is operable to select between signals 106 and a copy of 107. In one embodiment, multiplexer 202 directly receives signals 107 and 106. In one embodiment, multiplexer 202 receives its select signal, loop select, from a replica select logic 207. In one embodiment, multiplexer 202 is an analog multiplexer which is operable (via loop select signal) to provide one of 106 or 107 to error amplifier 203.

In one embodiment, output 210 of multiplexer 202 is filtered by an RC (resistor-capacitor) network 205 (also referred as first compensation network). In one embodiment, output 211 of first compensation network 205 is compared against Vref by error amplifier 203. In one embodiment, second compensation network 206 is coupled to output of first compensation network 205 and output of error amplifier 203. In one embodiment, first and second compensation networks 205 and 206 optimize response of the feedback path while maintaining stability. For example, first and second compensation networks 205 and 206 set the transfer function of the compensation unit, which is formed by the combination of first and second compensation networks 205 and 206 and error amplifier 203. In one embodiment, error amplifier 203 is a differential amplifier. In one embodiment, output 212 of error amplifier 203 is received by signal generator 204. In one embodiment, output 212 indicates whether signals 106 or 107 (depending on which is selected by multiplexer 202) is above or below Vref. In one embodiment, output 212 instructs signal generator 204 to adjust duty cycle of the signal 105 generated by signal generator 204. In one embodiment, signal generator 204 is a PWM. In other embodiments, other types of signal generators may be used.

In one embodiment, reference generator 208 is a bandgap circuit (not shown) that generates Vref. In one embodiment, reference generator 208 is a voltage divider (e.g., resistor divider network). In other embodiments, other types of reference generators may be used. In one embodiment, replica select logic 207 comprises a multiplexer which selects between various options for generating loop select signal for controlling multiplexer 202. In one embodiment, the various options include using power-good signal to instruct multiplexer 202 when to switch from open loop configuration of main bridge 101a to closed loop configuration. For example, when a power-good detector (not shown) detects that Vout1 106 has reached a predetermined level (e.g., 80% of its target level) then multiplexer 202 is instructed via loop select signal to select signal 106 as feedback signal instead of signal 107 (or its copy signal 209).

In one embodiment, the various options include a timer signal generated from a counter (not shown). In one embodiment, timer signal indicates start-up duration. For example, timer signal may cause loop select signal to select signal 106 as feedback signal instead of signal 107 (or its copy signal 209) after the timer (counter) expires or completes its predetermined count. In this example, timer signal causes multiplexer 202 to select signal 107 after start-up duration completes. Start-up duration may be a predetermined time (e.g., 1 ms) or programmable duration. In one embodiment, the various options include another logic that generates a signal indicating voltage level of signal 106 is substantially close to Vref. In this embodiment, the signal generated by the other logic is used to generate loop select signal to cause multiplexer 202 to select signal 107 (or its copy 209) when voltage level of signal 106 is not substantially close to Vref, and to select signal 106 when voltage level of signal 106 is substantially close to Vref.

Figure 3:
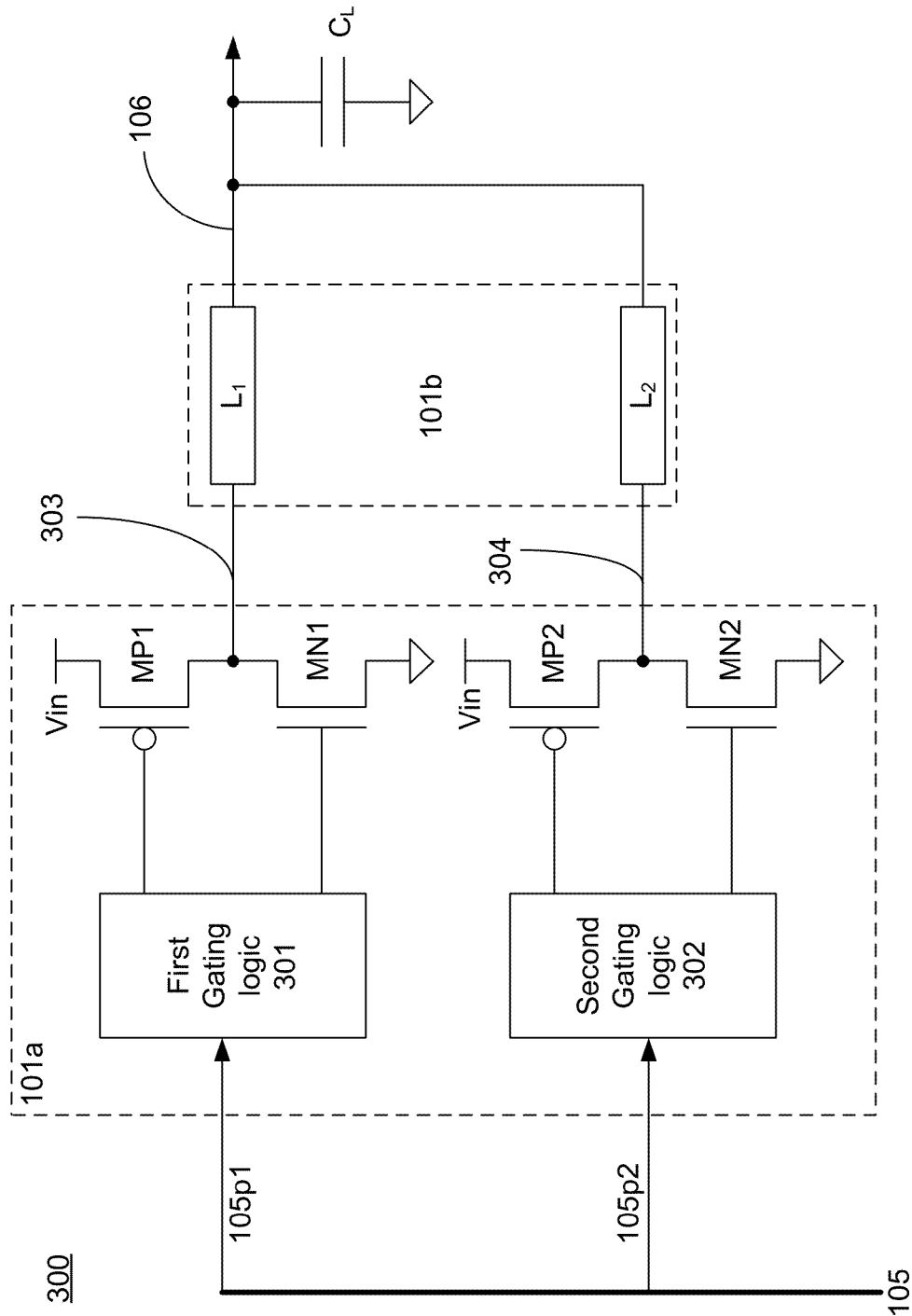
FIG. 3 is a circuit of a first VR of the dual VR architecture, according to one embodiment of the disclosure.

FIG. 3 is a circuit 300 of first VR 101 of dual VR architecture 100, according to one embodiment of the disclosure. It is pointed out that those elements of FIG. 3 having the same reference numbers (or names) as the elements of any other figure can operate or function in any manner similar to that described, but are not limited to such.

In one embodiment, circuit 300 comprises main bridge 101a, one or more inductors 101b, and load capacitor $C_L$. The output of circuit 300 is 106. In one embodiment, main bridge 101a is a multi-phase bridge which receives two phases of signal 105-105p1 and 105p2. In one embodiment, 105p1 signal is out of phase relative to 105p2. For example, 105p1 signal is out of phase relative to 105p2 by 180°. While the embodiment illustrates a dual phase multi-phase bridge, any number of phases may be used to source and/or sink current to and from load capacitor $C_L$.

In one embodiment, multi-phase bridge 101a comprises first gating logic 301 or driver to drive first set of low and high side switches including p-type MP1 (high side switch) and n-type MN1 (low side switch). In one embodiment, multi-phase bridge 101a comprises second gating logic 302 or driver to drive second set of low and high side switches including p-type MP2 (high side switch) and n-type MN2 (low side switch). In one embodiment, first and second gating logics 301 and 302 are buffers. In one embodiment, each of first and second gating logics 301 and 302 comprise a switch driver or buffer, a dead-time control circuitry, and slew rate control circuitry.

In one embodiment, switch driver or buffer is implemented with inverter. In one embodiment, slew rate control circuitry is built into the switch driver or buffer such that the slew rate of the signal, from the switch driver or buffer which drives switches MP1/MN1 and MP2/MN2, is controlled to avoid large overshoot on nodes 303 and 304. In one embodiment, dead-time control circuitry comprises logic to ensure that p-type MP1 and n-type MN1 switches do not switch simultaneously such that crowbar current from Vin to ground is avoided.

In one embodiment, output 303 of first set of switches sources and/or sinks current to and/or from load capacitor $C_L$ via inductor $L_1$. In one embodiment, output 304 of second set of switches sources and/or sinks current to or from load capacitor $C_L$ via inductor $L_2$. In one embodiment, inductor $L_1$ is directly coupled to inductor $L_2$. In one embodiment, one end of inductor $L_1$ is coupled to another end of inductor $L_2$, which is the common end coupled to load capacitor $C_L$. In one embodiment, inductor $L_1$ is substantially the same or identical to inductor $L_2$. In one embodiment, the combined inductance of inductor $L_1$ and inductor $L_2$ is about while load capacitor $C_L$ is around 100 s of μF for first VR 101 to switch at about 1-3 MHz. In another embodiment, other values for combined inductance and load capacitance may be used according to the desired switching frequency of the VR.

Figure 4:
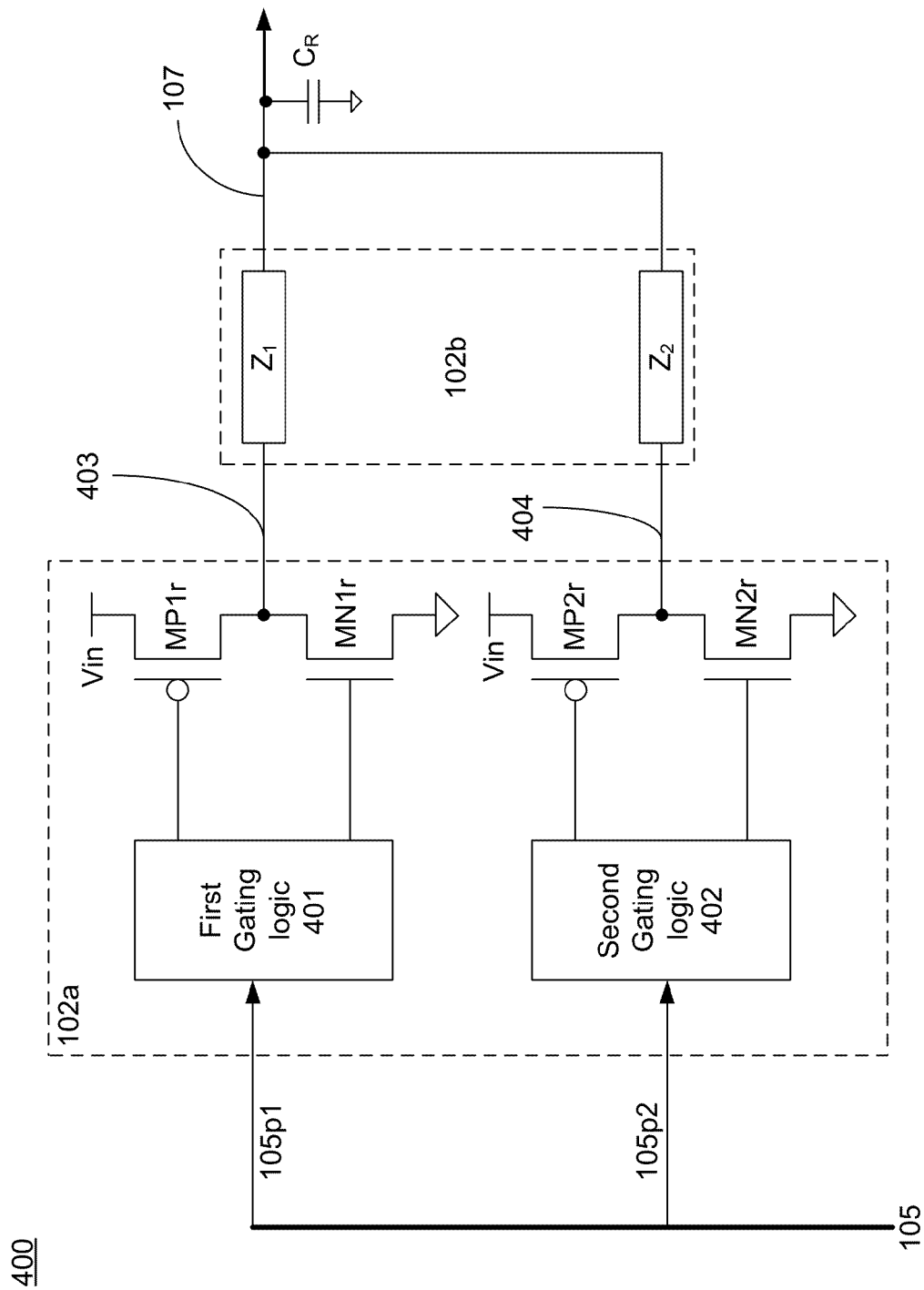
FIG. 4 is a circuit of a second VR of the dual VR architecture, according to one embodiment of the disclosure.

FIG. 4 is a circuit 400 of second VR 102 of dual VR architecture 100, according to one embodiment of the disclosure. It is pointed out that those elements of FIG. 4 having the same reference numbers (or names) as the elements of any other figure can operate or function in any manner similar to that described, but are not limited to such.

In one embodiment, circuit 400 comprises a replica bridge 102a, one or more impedance units 102b, and replica capacitor $C_R$. The output of circuit 400 is 107. In one embodiment, replica bridge 102a is a multi-phase replica bridge which receives two phases of signal 105-105p1 and 105p2. In one embodiment, 105p1 signal is out of phase relative to 105p2. For example, 105p1 signal is out of phase relative to 105p2 by 180°. While the embodiment illustrates a dual phase multi-phase replica bridge, any number of phases may be used to source and/or sink current to and from replica capacitor $C_R$.

In one embodiment, multi-phase replica bridge 102a comprises first gating logic 401 or driver to drive first set of low and high side switches including p-type MP1r (high side switch) and n-type MN1r (low side switch). In one embodiment, multi-phase replica bridge 102a comprises second gating logic 402 or driver to drive second set of low and high side switches including p-type MP2r (high side switch) and n-type MN2r (low side switch). In one embodiment, first and second gating logics 401 and 402 are buffers.

In one embodiment, each of first and second gating logics 401 and 402 comprise a switch driver or buffer, a dead-time control circuitry, and slew rate control circuitry. In one embodiment, switch driver or buffer is implemented with inverter. In one embodiment, slew rate control circuitry is built into the switch driver or buffer such that the slew rate of the signal, from the switch driver or buffer which drives switches MP1r/MN1r and MP2r/MN2r, is controlled to avoid large overshoot on nodes 403 and 404. In one embodiment, dead-time control circuitry comprises logic to ensure that p-type MP1r and n-type MN1r switches do not switch simultaneously such that crow bar current from Vin to ground is avoided.

In one embodiment, output 403 of first set of switches sources and/or sinks current to and/or from replica capacitor $C_R$ via first impedance $Z_1$. In one embodiment, output 404 of second set of switches sources and/or sinks current to or from replica capacitor $C_R$ via second impedance $Z_2$. In this embodiment, transfer function of impedance unit 102b and replica capacitor $C_R$ is substantially the same as the transfer function of inductors 101a and load capacitor $C_L$.

In one embodiment, first set of low and high side switches including p-type MP1r (high side switch) and n-type MN1r (low side switch) of replica bridge 102a are substantially smaller in size (e.g., width and thus area) than first set of low and high side switches including p-type MP1 (high side switch) and n-type MN1 (low side switch) of main bridge 101a. For example, MP1r is 1000 times smaller in width (and/or length) compared to MP1, MP2r is 1000 times smaller in width (and/or length) compared to MP2, and MN1r is 1000 times smaller in width (and/or length) compared to MN1, MN2r is 1000 times smaller in width (and/or length) compared to MN2.

In one embodiment, first and second gating logics 401 and 402 of replica bridge 102a are identical in logic function as first and second gating logics 301 and 302 of main bridge 101a. In one embodiment, first and second gating logics 401 and 402 are substantially smaller in size (area) compared to size (area) first and second gating logics 301 and 302 of main bridge 101a. In one embodiment, replica capacitor $C_R$ is substantially smaller in size (area) compared to load capacitor $C_L$. For example, replica capacitor $C_R$ is 1000 times smaller in size (area) compared to load capacitor $C_L$.

In one embodiment, impedance units $Z_1$ and $Z_2$ are resistors. In one embodiment, impedance units $Z_1$ and $Z_2$ are inductors. In one embodiment, each of impedance units $Z_1$ and $Z_2$ comprise inductors and resistors. In one embodiment, the size (area) of impedance units $Z_1$ and $Z_2$ is substantially smaller than the size of inductors $L_1$ and $L_2$ of circuit 300. For example, size (area) of impedance units $Z_1$ and $Z_2$ is 1000 smaller than size (area) of inductors $L_1$ and $L_2$ of circuit 300.

Figure 5A:
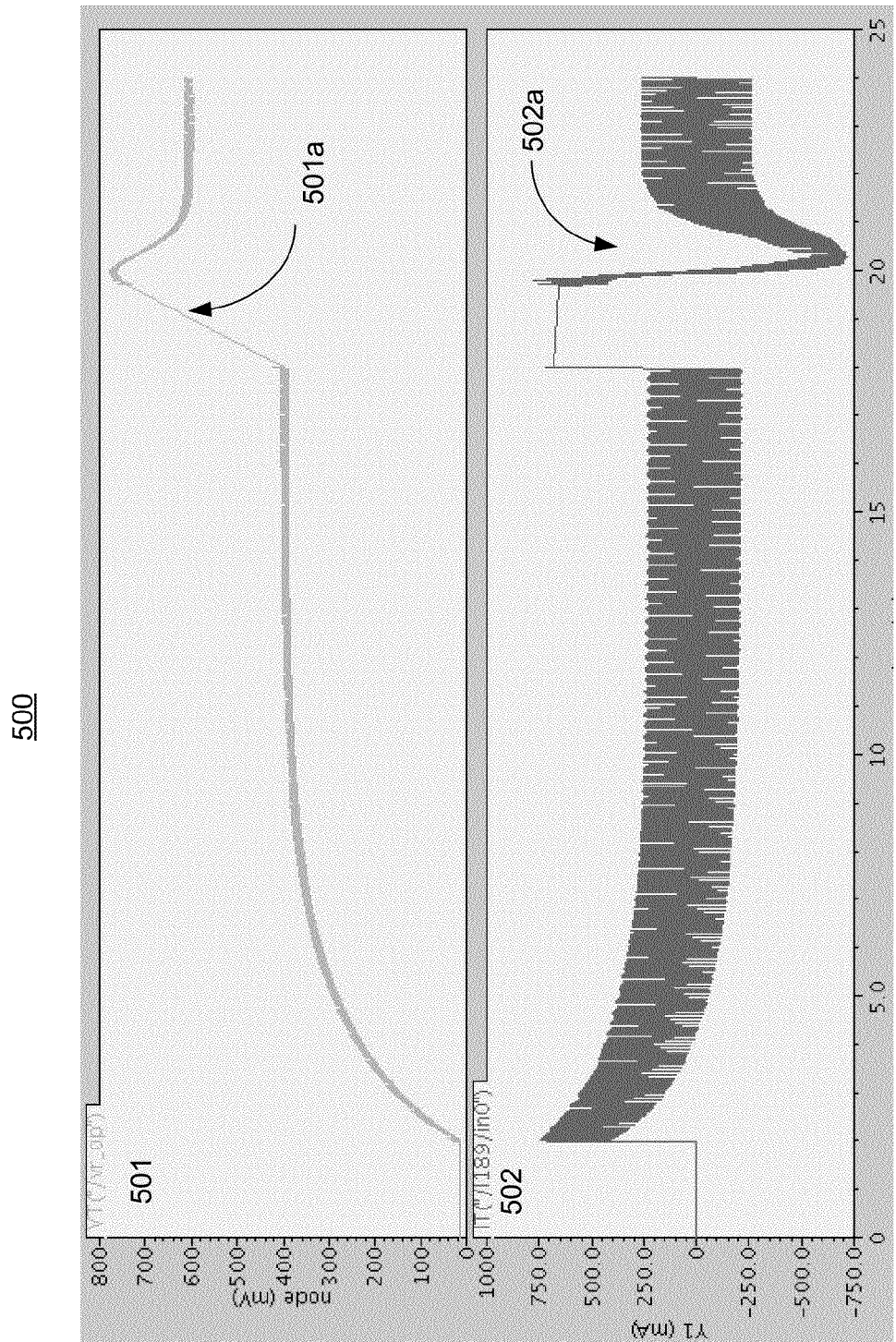
FIGS. 5A-B are plots showing output current and voltage using traditional single VR architecture (not shown) with safe start option compared to using the dual VR architecture, according to one embodiment of the disclosure.
Figure 5B:
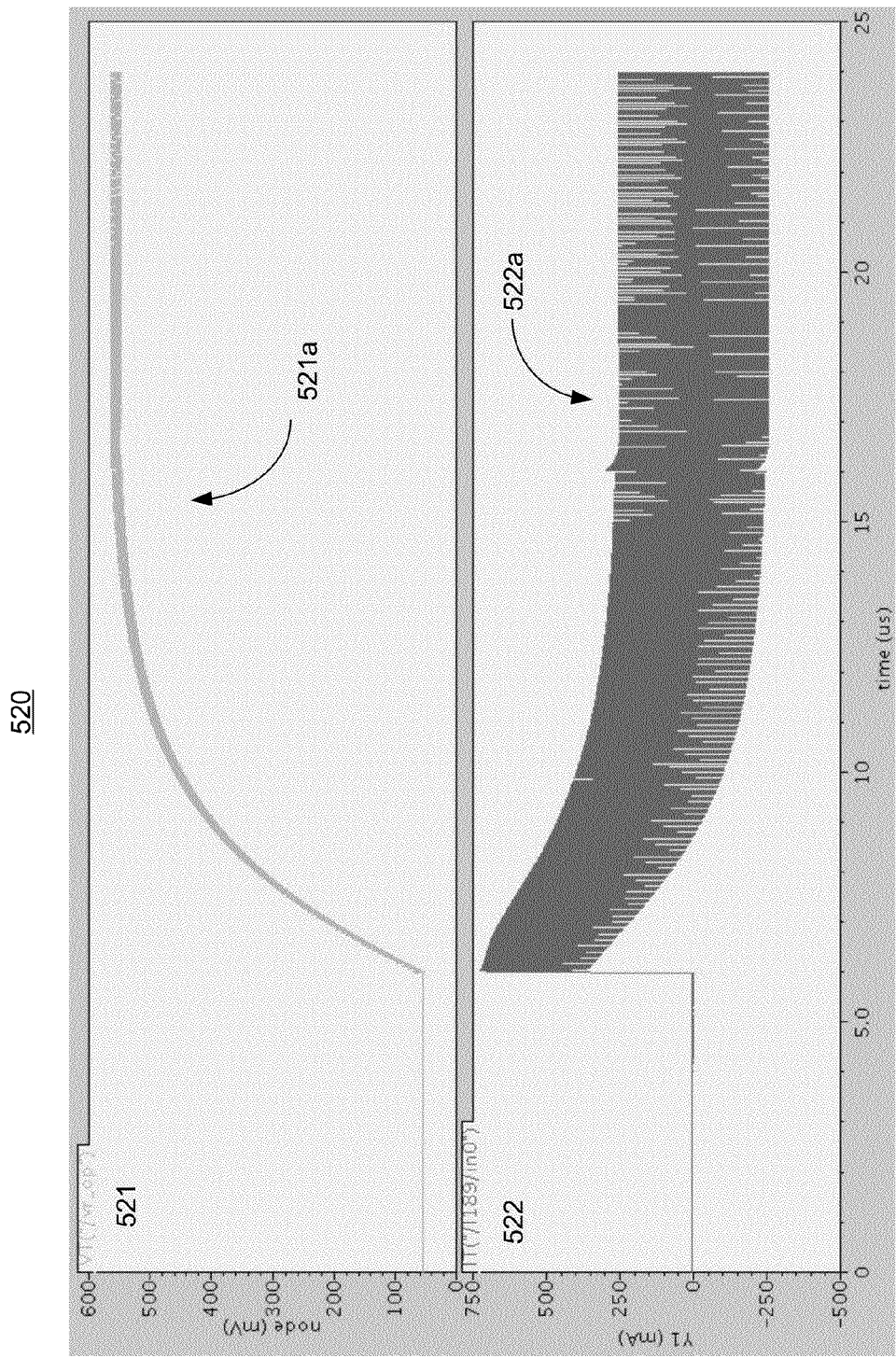

FIGS. 5A-B are plots showing output current and voltage using traditional single VR architecture (not shown) with safe start option compared to using the dual VR architecture 100, according to one embodiment of the disclosure. It is pointed out that those elements of FIGS. 5A-B having the same reference numbers (or names) as the elements of any other figure can operate or function in any manner similar to that described, but are not limited to such.

FIG. 5A is a plot 500 with two sub-plots 501 and 502. X-axis for Sub-plot 501 is time in mS and y-axis for Sub-plot 501 is mV. Sub-plot 501 shows waveform 501a which is the output voltage (at load capacitor) of the traditional single VR architecture. As shown, when traditional single VR architecture transitions from safe start to normal operation, an overshoot is experienced on the output. In this example, the overshoot begins near time 18 mS and continues till 21 mS. Such overshoot may damage devices coupled to output node of the traditional single VR architecture. Sub-plot 502 shows waveform 502a which is the output current (at load capacitor) of the traditional single VR architecture. X-axis for Sub-plot 502 is time mS and y-axis for Sub-plot 502 is mA. As shown, when traditional single VR architecture transitions from safe start to normal operation, in-rush current is experienced through the output inductor. In this example, in-rush current begins near time 18 mS and continues till 21 mS. Such in-rush current may damage devices coupled to output node of the traditional single VR architecture.

FIG. 5B is a plot 520 with two sub-plots 521 and 522. X-axis for Sub-plot 521 is time in mS and y-axis for Sub-plot 521 is mV. Sub-plot 521 shows waveform 521a which is the output voltage (at load capacitor) at node 106 of dual VR architecture 100. As shown, when dual VR architecture 100 transitions from open loop mode operation of first VR 101 to closed loop operation of first VR 101, no overshoot is experienced on the output node 106. Sub-plot 522 shows waveform 522a which is the output current (at load capacitor) through node 106 of the dual VR architecture 100. As shown, when dual VR architecture 100 transitions from open loop mode operation of first VR 101 to closed loop operation of first VR 101, no in-rush current is experienced through the output inductor 101b.

Figure 6:
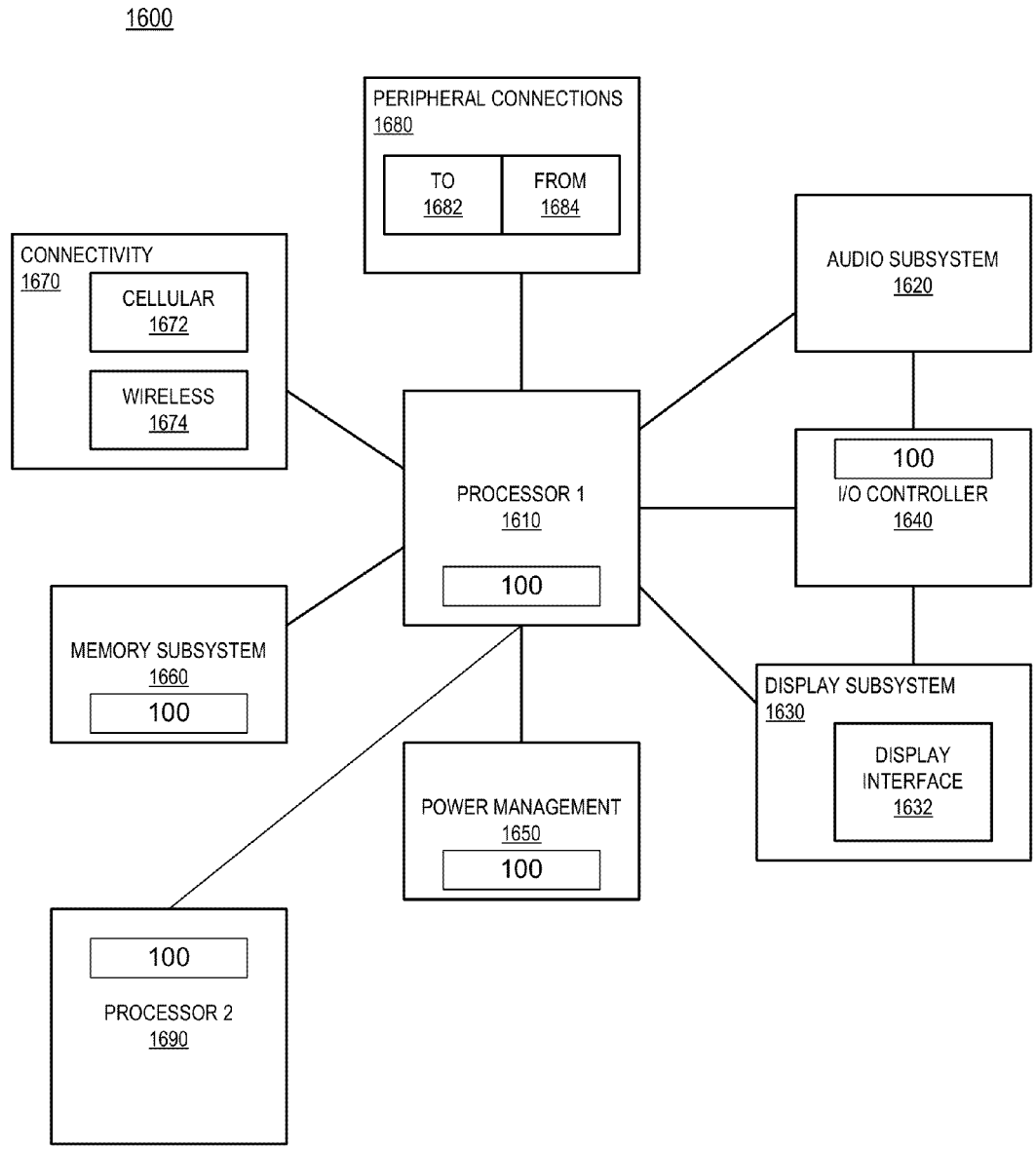
FIG. 6 is a smart device or a computer system or a SOC (system on chip) with the dual VR architecture, according to one embodiment of the disclosure.

FIG. 6 is a smart device or a computer system or a SOC (system on chip) with the dual VR architecture, according to one embodiment of the disclosure. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device 1600 (also called computing device) in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with dual voltage regulator architecture, according to the embodiments discussed. Other blocks of the computing device 1600 may also include dual voltage regulator architecture. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device 1600. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, an apparatus comprises: a first voltage regulator to provide regulated voltage to an output node coupled to a load, the first voltage regulator operable to be in open loop via a bypass unit, the first voltage regulator including a comparator; and a second voltage regulator, coupled to the first voltage regulator, operable to be in closed loop, via the bypass unit, to provide a reference voltage for the comparator of the first voltage regulator. In one embodiment, the apparatus further comprises a programmable timer for controlling the bypass unit.

In one embodiment, the bypass unit is controllable by a power good signal. In one embodiment, the second voltage regulator is smaller in size than the first voltage regulator. In one embodiment, the first voltage regulator comprises an inductor and a capacitor coupled to the output node, wherein the first voltage regulator has a first transfer function according to the inductor and capacitor coupled to the output node, and wherein the second voltage regulator has a second transfer function substantially equal to the first transfer function. In one embodiment, the first and second voltage regulators comprise a signal generator. In one embodiment, the second voltage regulator comprises a voltage follower, output of which is coupled to the bypass unit.

In another example, in one embodiment, an integrated circuit (IC) comprises: a first voltage regulator to provide regulated voltage to an output node coupled to a load, the first voltage regulator operable to be in open loop for a first duration; and a second voltage regulator, coupled to the first voltage regulator, operable to be enabled during the first duration to provide a reference voltage for a comparator of the first voltage regulator. In one embodiment, the second voltage regulator is a replica of the first voltage regulator.

In one embodiment, the IC further comprises logic to bypass the second voltage regulator after the first duration expires. In one embodiment, the IC further comprises logic to operate the first voltage regulator in closed loop after the first duration expires. In one embodiment, the IC further comprises logic to expire the first duration when second voltage regulator provides the reference voltage substantially equal to another reference voltage received by the comparator of the first voltage regulator. In one embodiment, the second voltage regulator is smaller in size than the first voltage regulator.

In one embodiment, the first voltage regulator comprises an inductor and a capacitor coupled to the output node, wherein the first voltage regulator has a first transfer function according to the inductor and capacitor coupled to the output node. In one embodiment, the second voltage regulator has a second transfer function substantially equal to the first transfer function. In one embodiment, the second voltage regulator comprises a resistor and capacitor network with a transfer function substantially equal to a transfer function of an inductor and a capacitor coupled to the output node, wherein the inductor is coupled to the first voltage regulator.

In another example, in one embodiment, a system comprises: a memory unit; a multi-core processor coupled to the memory unit, the multi-core processor comprising: a first voltage regulator to provide regulated voltage to an output node coupled to a load, the first voltage regulator operable to be in open loop via a bypass unit, the first voltage regulator including a comparator; and a second voltage regulator, coupled to the first voltage regulator, operable to be in closed loop, via the bypass unit, to provide a reference voltage for the comparator of the first voltage regulator; and a wireless interface for communicatively coupling the multi-core processor with another device.

In one embodiment, the system further comprises a display unit (e.g., touch screen). In one embodiment, the second voltage regulator is smaller in size than the first voltage regulator. In one embodiment, the first voltage regulator comprises an inductor and a capacitor coupled to the output node, wherein the first voltage regulator has a first transfer function according to the inductor and capacitor coupled to the output node, and wherein the second voltage regulator has a second transfer function substantially equal to the first transfer function.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first voltage regulator to provide regulated voltage to an output node coupled to a load, the first voltage regulator operable to be in open loop via a bypass unit, the first voltage regulator including a comparator; and
a second voltage regulator, coupled to the first voltage regulator, operable to be in closed loop, via the bypass unit, to provide a reference voltage for the comparator of the first voltage regulator.

2. The apparatus of claim 1 further comprises a programmable timer for controlling the bypass unit.

3. The apparatus of claim 1, wherein the bypass unit is controllable by a power good signal.

4. The apparatus of claim 1, wherein the second voltage regulator is smaller in size than the first voltage regulator.

5. The apparatus of claim 1, wherein the first voltage regulator comprises an inductor and a capacitor coupled to the output node, wherein the first voltage regulator has a first transfer function according to the inductor and capacitor coupled to the output node, and wherein the second voltage regulator has a second transfer function substantially equal to the first transfer function.

6. The apparatus of claim 1, wherein the first and second voltage regulators comprise a signal generator.

7. The apparatus of claim 1, wherein the second voltage regulator comprises a voltage follower, output of which is coupled to the bypass unit.

8. An integrated circuit (IC) comprising:
a first voltage regulator to provide regulated voltage to an output node coupled to a load, the first voltage regulator operable to be in open loop for a first duration; and
a second voltage regulator, coupled to the first voltage regulator, operable to be enabled during the first duration to provide a reference voltage for a comparator of the first voltage regulator.

9. The IC of claim 8, wherein the second voltage regulator is a replica of the first voltage regulator.

10. The IC of claim 8 further comprises logic to bypass the second voltage regulator after the first duration expires.

11. The IC of claim 8 further comprises logic to operate the first voltage regulator in closed loop after the first duration expires.

12. The IC of claim 8 further comprises logic to expire the first duration when second voltage regulator provides the reference voltage substantially equal to another reference voltage received by the comparator of the first voltage regulator.

13. The IC of claim 8, wherein the second voltage regulator is smaller in size than the first voltage regulator.

14. The IC of claim 8, wherein the first voltage regulator comprises an inductor and a capacitor coupled to the output node, wherein the first voltage regulator has a first transfer function according to the inductor and capacitor coupled to the output node.

15. The IC of claim 14, wherein the second voltage regulator has a second transfer function substantially equal to the first transfer function.

16. The IC of claim 8, wherein the second voltage regulator comprises a resistor and capacitor network with a transfer function substantially equal to a transfer function of an inductor and a capacitor coupled to the output node, wherein the inductor is coupled to the first voltage regulator.

17. A system comprising:
a memory unit;
a multi-core processor coupled to the memory unit, the multi-core processor comprising:
a first voltage regulator to provide regulated voltage to an output node coupled to a load, the first voltage regulator operable to be in open loop via a bypass unit, the first voltage regulator including a comparator; and
a second voltage regulator, coupled to the first voltage regulator, operable to be in closed loop, via the bypass unit, to provide a reference voltage for the comparator of the first voltage regulator; and
a wireless interface for communicatively coupling the multi-core processor with another device.

18. The system of claim 17 further comprising a display unit.

19. The system of claim 17, wherein the second voltage regulator is smaller in size than the first voltage regulator.

20. The system of claim 17, wherein the first voltage regulator comprises an inductor and a capacitor coupled to the output node, wherein the first voltage regulator has a first transfer function according to the inductor and capacitor coupled to the output node, and wherein the second voltage regulator has a second transfer function substantially equal to the first transfer function.

* * * * *